(12) United States Patent
Wu et al.

(10) Patent No.: US 9,719,766 B2
(45) Date of Patent: Aug. 1, 2017

(54) METHOD AND SYSTEM FOR MEASUREMENT USING A TELESCOPIC GAUGE

(71) Applicant: General Electric Company, Schenectady, NY (US)

(72) Inventors: Juntao Wu, Niskayuna, NY (US); Robert William Tait, Niskayuna, NY (US); Chun Zhan, Niskayuna, NY (US); Maxine Marie Gibeau, Slingerlands, NY (US); John Brandon Laflen, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 170 days.

(21) Appl. No.: 14/624,592

(22) Filed: Feb. 18, 2015

(65) Prior Publication Data
US 2016/0238364 A1 Aug. 18, 2016

(51) Int. Cl.
*G01B 3/20* (2006.01)
*G01B 5/12* (2006.01)
*G01B 3/26* (2006.01)

(52) U.S. Cl.
CPC ............. *G01B 3/205* (2013.01); *G01B 3/26* (2013.01); *G01B 5/12* (2013.01); *G01B 2210/58* (2013.01)

(58) Field of Classification Search
CPC ... G01B 3/00; G01B 5/00; G01B 5/02; G01B 3/205; G01B 5/12; G01B 3/26; G01B 2210/58; G01C 15/00; G01C 15/06
(Continued)

(56) References Cited

U.S. PATENT DOCUMENTS 4,638,563 A * 1/1987 Buniff ..................... G01B 3/08
33/833
4,993,160 A * 2/1991 Fraley ................... G01C 15/02
33/286

(Continued)

FOREIGN PATENT DOCUMENTS

CN    100501310 C   6/2009
WO    9718436 A1    5/1997

OTHER PUBLICATIONS

Hoefel et al., "Subsurface Telemetry in Conductive Medium for Remote Sensors [Well-Logging Applications]", Antennas and Propagation Society International Symposium, 2003. IEEE (vol. 2), pp. 227-230, Jun. 2003.

(Continued)

*Primary Examiner* — Yaritza Guadalupe
(74) *Attorney, Agent, or Firm* — John P. Darling

(57) ABSTRACT

A measurement system for determining dimensions of a measurement zone of a physical asset is presented. The system includes a telescoping gauge configured to determine one or more analog measurements corresponding to the measurement zone of the physical asset, where the telescoping gauge includes a sliding arm and a vertical arm. Furthermore, the system includes a data digitizer operatively coupled to the telescoping gauge and configured to convert the one or more analog measurements to corresponding one or more digital measurements. In addition, the system includes a wireless unit operatively coupled to the telescoping gauge and configured to wirelessly transmit the one or more digital measurements.

20 Claims, 7 Drawing Sheets

(58) Field of Classification Search
USPC .................................. 33/809, 783, 501.07
See application file for complete search history.

(56) References Cited

U.S. PATENT DOCUMENTS

| | | | | |
|---|---|---|---|---|
| 5,647,139 | A * | 7/1997 | Richardson | G01B 5/0025 33/533 |
| 5,694,697 | A | 12/1997 | Curtis | |
| 5,894,344 | A * | 4/1999 | Tamez | G01C 15/00 33/292 |
| 6,598,308 | B1 * | 7/2003 | Johansson | G01B 5/0025 33/608 |
| 7,257,050 | B2 | 8/2007 | Stewart et al. | |
| 7,275,335 | B2 * | 10/2007 | Holec | G01B 5/0025 33/203.21 |
| 7,913,411 | B2 | 3/2011 | Klepp | |
| 7,994,932 | B2 | 8/2011 | Huang et al. | |
| 7,997,001 | B1 * | 8/2011 | Mekid | G01B 3/30 33/783 |
| 8,572,856 | B1 * | 11/2013 | Vannoy | G01C 15/06 33/296 |
| 2005/0005467 | A1 * | 1/2005 | Hannel | G01B 5/18 33/542 |
| 2007/0039197 | A1 * | 2/2007 | Holec | G01B 5/0025 33/784 |
| 2009/0235546 | A1 * | 9/2009 | Klepp | G01B 3/26 33/502 |
| 2010/0088914 | A1 * | 4/2010 | Cerwin | E01B 35/02 33/645 |
| 2010/0292955 | A1 | 11/2010 | Van Stan, II et al. | |
| 2011/0113640 | A1 * | 5/2011 | Molina | G01B 3/205 33/608 |
| 2011/0289788 | A1 * | 12/2011 | Steffensen | G01C 15/06 33/296 |
| 2012/0110867 | A1 * | 5/2012 | Molina | G01B 3/205 33/608 |
| 2013/0192077 | A1 * | 8/2013 | Colombo | G01B 5/12 33/701 |
| 2016/0238364 | A1 * | 8/2016 | Wu | G01B 3/205 |

OTHER PUBLICATIONS

Zhi-Hui et al., "Resistance Angle Sensor Based Tree Diameter Gauge", Environmental Science and Information Application Technology (ESIAT), 2010 International Conference on (vol. 4 ), pp. 262-264, Jul. 2010.

Khairi et al., "Optimization of Strain Gauge for Stem Measurement Using PIC Based Instrumentation", System Engineering and Technology (ICSET), 2011 IEEE International Conference, pp. 196-199, Jun. 2011.

* cited by examiner

METHOD AND SYSTEM FOR MEASUREMENT USING A TELESCOPIC GAUGE

BACKGROUND

Embodiments of the present disclosure generally relate to a telescoping gauge and more specifically to a digital wireless telescoping gauge having improved repeatability, better accuracy, and enhanced resolution.

Conventionally, a telescoping gauge is employed by a field inspector for measuring an interior radius of an element, such as a hole or a pipe of a physical system/physical asset. The physical assets may include components of oil and gas fields, for example. The telescoping gauge is an indirect measuring device, where a head of the telescoping gauge is first positioned inside holes or pipes and subsequently, the head of the telescoping gauge is extended sideways to make contact with side walls of the holes or pipes. Further, the telescoping gauge is extracted from the holes or pipes and the length of the extended head of the telescoping gauge is measured using a micrometer or a Vernier caliper to determine the interior radius of the holes or pipes. Accordingly, the operation of the telescoping gauge involves two steps, that is, a measurement process and a recording process. Therefore, the operation of the telescoping gauge is cumbersome and involves manual intervention.

Additionally, inspection of the physical assets typically entails collecting data using the telescoping gauge. This collection of data is challenging and time consuming. Moreover, the data has to be subsequently analyzed to provide appropriate monitoring and inspection of the physical assets. The analysis of the data necessitates computational capabilities that are typically not instantly available to the field inspector.

In addition, the measurements employing the telescoping gauge are highly dependent on the experience and habits of the field inspector. Accordingly, efficiency and repeatability of the telescoping gauge may fail to meet desirable standards. Hence, the measurements employing the telescoping gauge may be inaccurate. The inaccurate measurements in turn may compromise servicing and maintenance of physical assets/systems.

BRIEF DESCRIPTION

In accordance with aspects of the present specification, a measurement system for determining dimensions of a measurement zone of a physical asset is presented. The system includes a telescoping gauge configured to determine one or more analog measurements corresponding to the measurement zone of the physical asset, where the telescoping gauge includes a sliding arm and a vertical arm. Furthermore, the system includes a data digitizer operatively coupled to the telescoping gauge and configured to convert the one or more analog measurements to corresponding one or more digital measurements. In addition, the system includes a wireless unit operatively coupled to the telescoping gauge and configured to wirelessly transmit the one or more digital measurements.

In accordance with another aspect of the present specification, a method for determining dimensions of a measurement zone of a physical asset is presented. The method includes determining one or more analog measurements corresponding to the measurement zone of the physical asset using a telescoping gauge, where the telescoping gauge includes at least two sliding arms, a vertical arm, or combinations thereof. Moreover, the method includes converting the one or more analog measurements to one or more digital measurements using a data digitizer. The method also includes transferring wirelessly the one or more digital measurements to a processing subsystem. Additionally, the method includes identifying in real-time a condition of the physical asset based on processing the one or more digital measurements.

In accordance with yet another aspect of the present specification, a system for measuring dimensions of a physical asset is presented. The system includes a measurement subsystem operatively coupled to the physical asset, where the measurement subsystem includes a telescoping gauge including at least two sliding arms and a vertical arm, where the telescoping gauge is disposed in a measurement zone of the physical asset and configured to determine one or more analog measurements corresponding to the measurement zone of the physical asset, a data digitizer operatively coupled to the telescoping gauge and configured to convert the one or more analog measurements to one or more corresponding digital measurements, and a wireless unit operatively coupled to the telescoping gauge, the data digitizer, or both and configured to wirelessly transmit the one or more digital measurements. Furthermore, the system includes a processing subsystem configured to identify in real-time a condition of the physical asset based on the one or more digital measurements, a series of digital measurements, or a combination thereof.

DRAWINGS

These and other features, aspects, and advantages of the present disclosure will become better understood when the following detailed description is read with reference to the accompanying drawings in which like characters represent like parts throughout the drawings, wherein.

Figure 1:
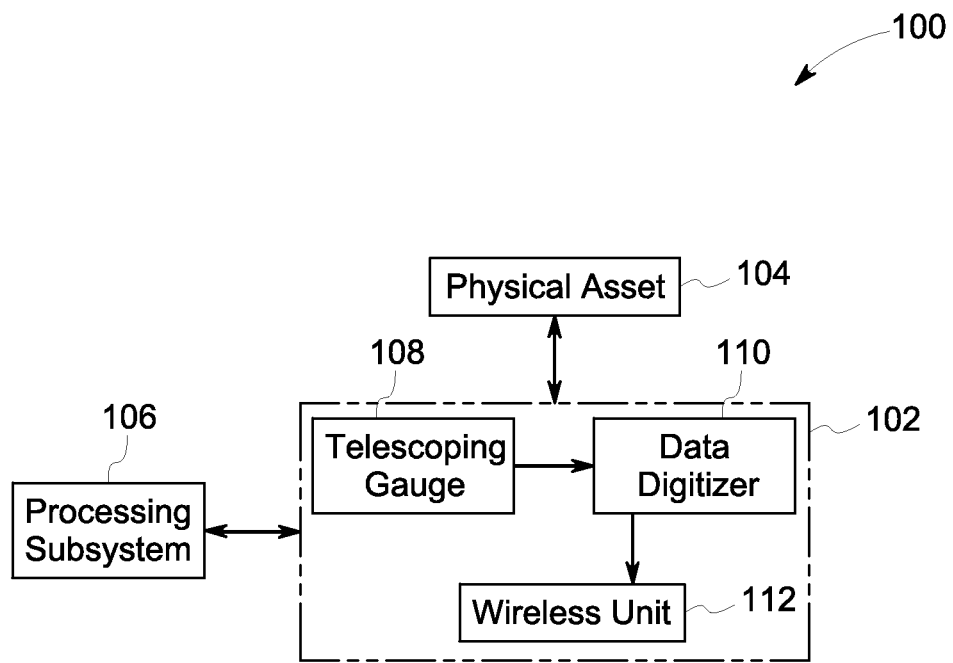
FIG. 1 is a block diagram representation of an exemplary measurement and analysis system, according to aspects of the present disclosure.
Figure 6:
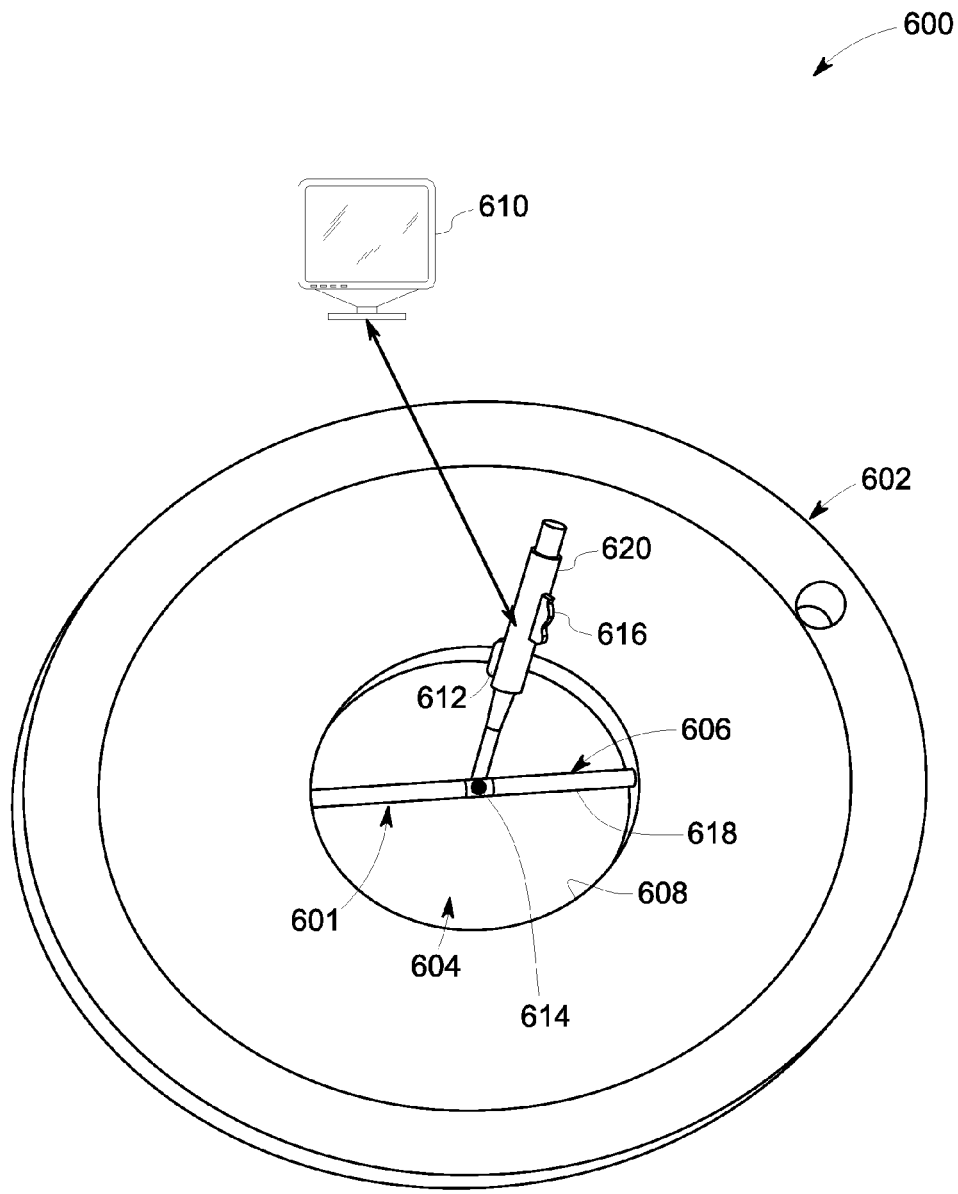
Figure 7:
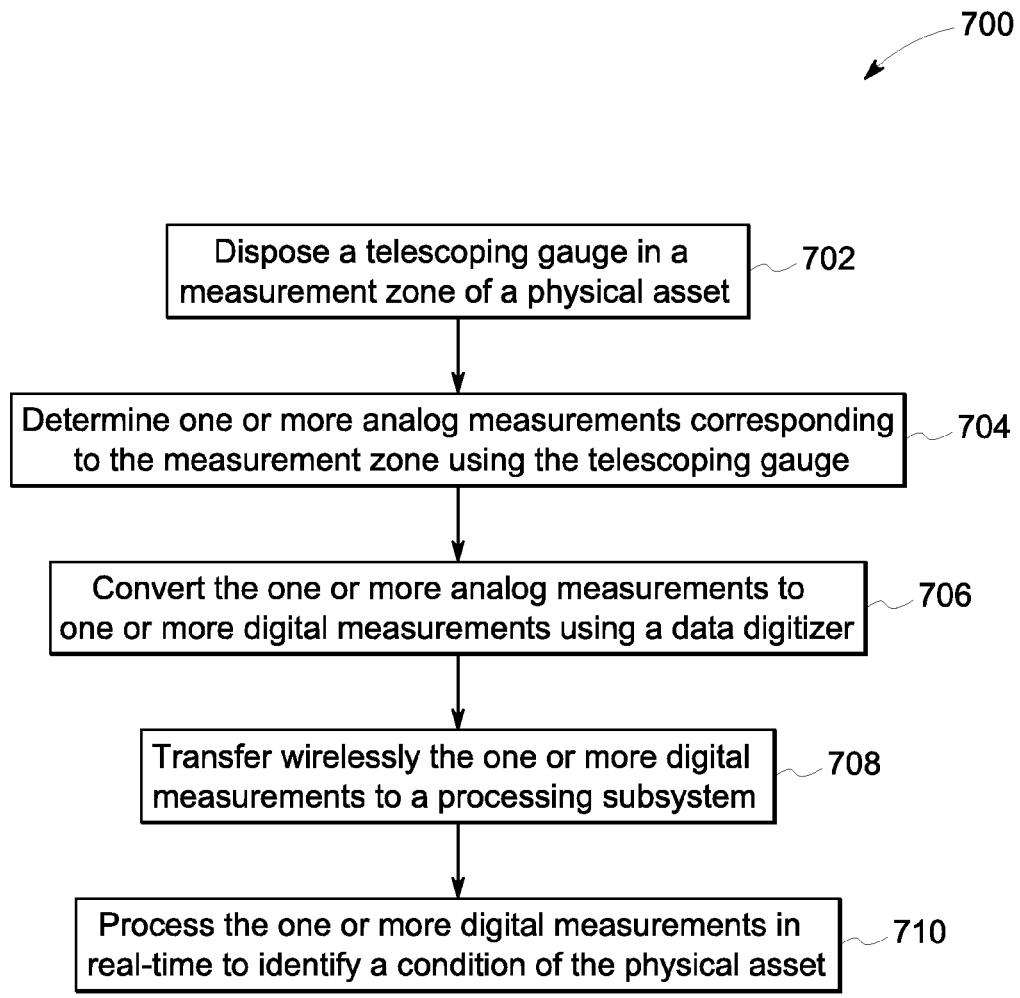

FIG. 6 is a diagrammatical representation of measuring dimensions of a physical asset using the exemplary measurement and analysis system of FIG. 1, according to aspects of the present disclosure; and FIG. 7 is a diagrammatical representation of a method of measuring dimensions corresponding to a physical asset using the measurement and analysis system of FIG. 1, according to aspects of the present disclosure.

DETAILED DESCRIPTION

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, a measurement and analysis system is presented. The measurement and analysis system includes a measurement subsystem that may be employed for measuring dimensions of a physical asset. In particular, a digital wireless telescoping gauge for measuring dimensions of a measurement zone corresponding to the physical asset, such as, but not limited to, components of oil and gas fields is presented. Employing the measurement and analysis system described hereinafter, a measurement and analysis system with improved repeatability, better accuracy, and enhanced resolution may be obtained.

Turning now to the drawings and by way of example, a diagrammatical representation 100 of an exemplary measurement and analysis system, according to aspects of the present disclosure, is depicted in FIG. 1. The measurement and analysis system 100 includes a measurement subsystem 102 and a processing subsystem 106. The measurement subsystem 102 may be employed to measure and analyze dimensions of a measurement zone corresponding to a physical asset 104. The term dimensions of the measurement zone, as used herein, may be used to refer to a diameter, a radius, a length, a breadth, and the like, of the measurement zone. The physical asset 104 may include components of an oil and gas field, such as, but not limited to, pipelines and tubes. Furthermore, the measurement zone corresponding to the physical asset 104 may include a bore, a hole, a pipe, and the like.

Additionally, in certain embodiments, the physical asset 104 may have uniform dimensions. By way of example, in one embodiment, the physical asset 104 may include a pipe. Accordingly, dimensions of a measurement zone corresponding to the pipe such as the radius and/or the diameter may be uniform throughout a length of the pipe. However, in certain other embodiments, the physical asset 104 may have a conical shape. Accordingly, dimensions of a measurement zone of the conical shaped physical asset 104 such as the radius and/or the diameter may vary along a length of the conical shaped physical asset 104. The exemplary measurement and analysis system 100 may be configured to efficiently measure the dimensions of a physical asset 104 having uniform dimensions and/or varying dimensions.

In a presently contemplated configuration, the measurement subsystem 102 may include a telescoping gauge 108, a data digitizer 110, and a wireless unit 112. The telescoping gauge 108 may include a vertical arm, sliding arms, a plurality of gears, or combinations thereof. The telescoping gauge 108 may be used to measure dimensions of bores, holes, and/or pipes. Moreover, in one embodiment, the telescoping gauge 108 may be configured to determine an analog measurement corresponding to the measurement zone. The term analog measurement, as used herein, may be used to refer to a linear displacement of the vertical and/or sliding arms of the telescoping gauge 108, a rotation angle of the plurality of gears of the telescoping gauge 108, or a combination thereof. In one example, the analog measurement is determined along with a time stamp. The term time stamp, as used herein, may be used to refer to the time at which the analog measurement is measured.

In one example, the analog measurement with the time stamp may be represented as 3.789 mm@2014-08-27 09:55:18:067. Different embodiments of the exemplary telescoping gauge 108 will be explained in greater detail with respect to FIGS. 2 and 3.

In accordance with aspects of the present disclosure, the data digitizer 110 may be operatively coupled to the telescoping gauge 108. The data digitizer 110 may be configured to convert the analog measurement determined by the telescoping gauge 108 to a corresponding digital measurement. The term digital measurement, as used herein, may be used to refer to a digital readout corresponding to the analog measurement. One example of the digital readout may include a numerical display depicting dimensions of the measurement zone of the physical asset 104.

Furthermore, in certain embodiments, the measurement subsystem 104 and in particular the data digitizer 110 may be configured to continuously digitize the analog measurements measured by the telescoping gauge 108. By way of example, the data digitizer 110 may be configured to digitize about 100 analog measurements per second. The digital measurements may be processed by the processing subsystem 106. Additionally, the processed digital measurements may be used to determine a state or condition of the physical asset. In one example, the condition of the physical asset may include a healthy condition or a faulty/anomaly condition of the physical asset.

Additionally, the data digitizer 110 may be configured to generate a series of digital measurements. The series of the digital measurements may then be processed by the processing subsystem 106 to generate application specific interpretations of the series of digital measurements. In one example, the processing subsystem 106 may be configured to monitor any change in the digital measurements over a determined time period. Accordingly, in this example, the series of digital measurements may include time indexed digital measurements. In another example, the series of digital measurements may correspond to a range of measurements acquired along a desired length of the physical asset 104. In this example, a desired measurement may be inferred and/or interpolated from the series of digital measurements.

In yet another example, the series of digital measurements may be smoothed to generate a smoothed series of digital measurements. In certain embodiments, the processing subsystem 106 may be configured to generate the smoothed series of digital measurements by averaging the series of digital measurements. Furthermore, the processing subsystem 106 may also be configured to identify a desired measurement based on the smoothed series of digital measurements. In one example, the desired measurement may be representative of a maximum value corresponding to the smoothed series of digital measurements. Moreover, the desired measurement may be employed to identify a condition of the physical asset 104. Use of the desired measurement aids in minimizing errors due to subjective judgment of a field operator.

In one non-limiting example, the data digitizer 110 may include a linear position encoder, a rotary encoder, or a combination thereof. Different embodiments of telescoping gauges employing other types of data digitizers will be explained in greater detail with respect to FIGS. 4 and 5.

Moreover, the wireless unit 112 may be operatively coupled to the data digitizer 110 and the processing subsystem 106. Once the analog measurement is converted to a corresponding digital measurement by the data digitizer 110, the wireless unit 112 may be configured to wirelessly transfer the digital measurements to the processing subsystem 106. A variety of communications protocols may be employed to transmit the digital measurement. Some examples of interfaces used for transmitting the digital measurements include, but are not limited to, a universal serial bus ("USB"), a recommended standard 232 ("RS232"), serial peripheral interface bus ("SPI"), an inter-integrated circuit ("I2C"), analog interfaces/and other proprietary I/O interfaces.

Furthermore, some examples of wireless techniques that the wireless unit 112 may use different wireless technologies, such as, but not limited to, Bluetooth technology, ultra-wideband technology, and local area wireless technology, such as Wi-Fi to transfer the digital measurements. In one exemplary embodiment, the wireless unit 112 may employ a Bluetooth® Low Energy ("BLE") protocol to communicate with processing subsystem 106. It may be noted that BLE is also known as Bluetooth SMART®. Bluetooth and Bluetooth SMART are registered trademarks of Bluetooth Special Interest Group of Kirkland, Wash. Use of the BLE protocol by the wireless unit 112 is advantageous as relatively low power is consumed while maintaining communication ranges associated with Bluetooth. Other wireless protocols including, for example 802.11b, Bluetooth, and ZigBee® (ZigBee is a registered trademark of the ZigBee Alliance of San Ramon, Calif.) may be employed by the wireless unit 112.

Furthermore, the digital measurements generated by the data digitizer 110 may be processed and analyzed by the processing subsystem 106. In one non-limiting example, the processing subsystem 106 may include a computer, a smartphone, an i-pad, an i-phone, a tablet, or combinations thereof. In the instances where the processing subsystem 106 is a mobile device such as the smartphone, the i-phone, or a combination thereof, the processing subsystem 106 enables ubiquitous connectivity, portability, and interoperability with the measurement subsystem 102.

It may be noted that in certain embodiments, interpreting or drawing inferences from the series of digital measurements may be complex and hence entail sophisticated processing. The sophisticated processing may be beyond the processing capability of the mobile device and/or may require the context of additional information that may not readily available on the mobile device. In this example, the processing subsystem 106 may be configured to rely on additional computing resources and/or storage and database structures (for example, a cloud). In certain embodiments, the additional resources may include remote servers.

In addition, the system 100 may be configured to determine a condition of the physical asset 104 based on the digital measurements generated by the measurement subsystem 102 and the data digitizer 110, in particular. In one embodiment, the processing subsystem 106 may be configured to compare the processed digital measurements with a baseline value to identify a condition of the physical asset 104. In one example, the condition of the physical asset 104 may include a healthy condition or an anomaly condition of the physical asset 104. A value of the digital measurement generated by the measurement subsystem 102 that lies outside a determined range of allowable values may be indicative of an anomaly condition of the physical asset 104. If an anomaly condition of the physical asset 104 is identified by the processing subsystem 106, the information about the anomaly condition may be transferred to a field operator. In one embodiment, the information about the anomaly condition may be communicated via activating an alarm and/or activating a visual display. Although the example of FIG. 1 represents the processing subsystem 106 as a separate unit, in one example, the processing subsystem 106 may form a part of the measurement subsystem 102. The measurement and analysis system 100 will be explained in greater detail with respect to FIG. 6. Also, a method of measuring dimensions of a physical asset using the measurement subsystem 102 will be explained in greater detail with respect to FIG. 7.

Figure 2:
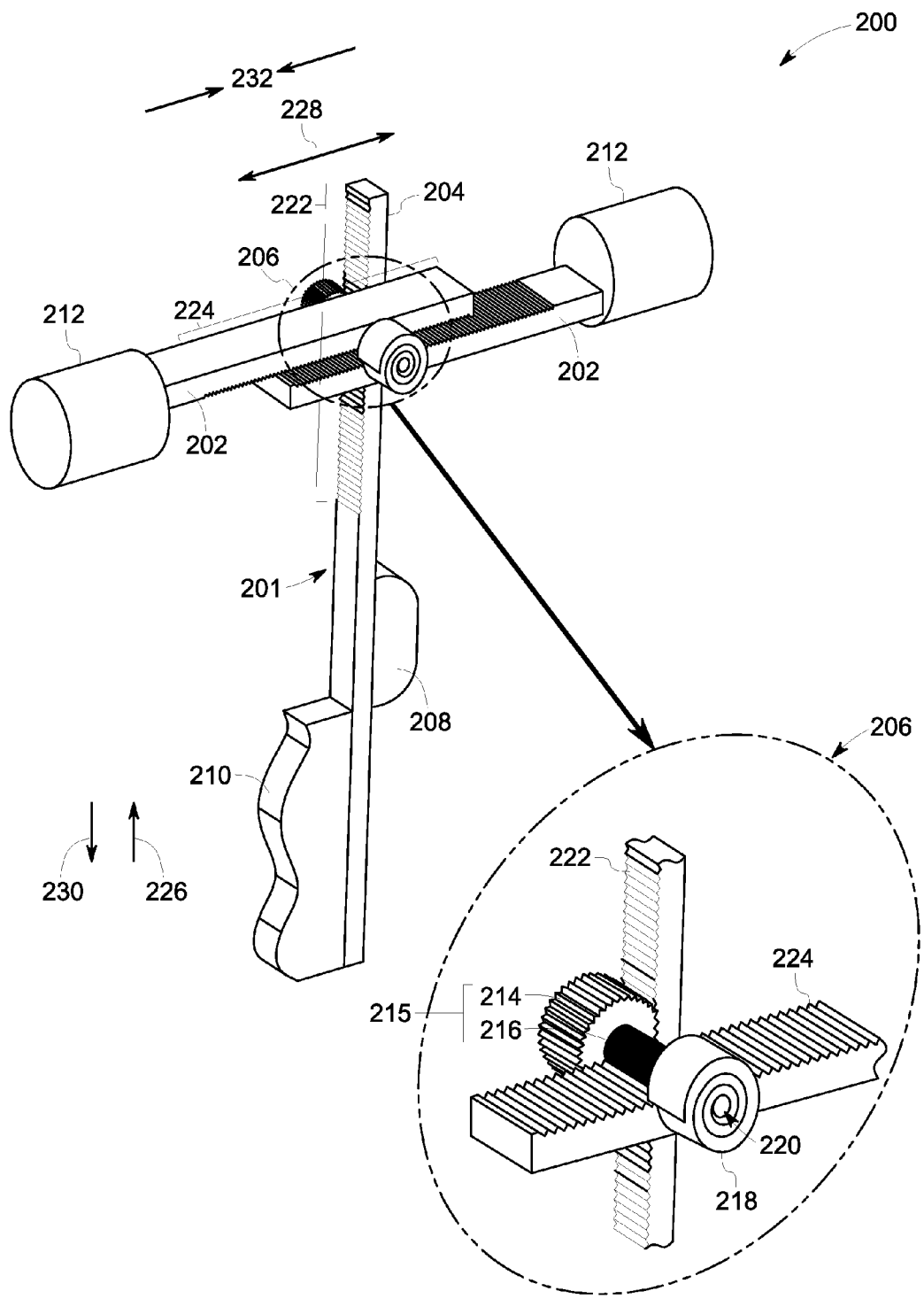
FIG. 2 is a diagrammatical representation of one embodiment of an exemplary measurement subsystem for use in the exemplary system of FIG. 1, according to aspects of the present disclosure.

Referring now to FIG. 2, a diagrammatical representation 200 of one embodiment of an exemplary measurement subsystem for use in the exemplary system 100 of FIG. 1, according to aspects of the present disclosure, is depicted. The measurement subsystem 200 includes a telescoping gauge 201, such as the telescoping gauge 108 of FIG. 1, a two stage knob 208, and a wireless unit 210. The telescoping gauge 201 includes sliding arms 202, a vertical arm 204, and a coupling unit 206. The sliding arms 202 may include at least two contacting caps 212 at two free ends of the sliding arms 202.

Moreover, the sliding arms 202 may be coupled to the vertical arm 204 via the coupling unit 206. Furthermore, the coupling unit 206 may include a plurality of gears 215, a spring 218, and an axis 220. The plurality of gears 215 includes a large gear 214 and a small gear 216. In one example, the spring 218 may be a spiral spring, a linear helix spring, or a combination thereof. The axis 220 and the spring 218 may be operatively coupled to the large gear 214 and the small gear 216. In accordance with aspects of the present disclosure, the large gear 214 and the small gear 216 may provide a mechanical amplification of about 2.5 times or greater via gear conversion. This mechanical amplification aids in enhancing the resolution of the measurement subsystem 200.

Furthermore, the two stage knob 208 may be operatively coupled to the vertical arm 204 of the measurement subsystem 200. The two stage knob 208 is configured to move the sliding arms 202 and the vertical arm 204 of the telescoping gauge 201. Particularly, the vertical arm 204 may be moved in an upward direction 226 or in a downward direction 230 by employing the two stage knob 208. The movement of the two stage knob 208 in the upward direction 226 may cause the vertical arm 204 to move upwards. In a similar fashion, moving the two stage knob 208 in the downward direction 230 may result in a downward movement of the vertical arm 204.

Moreover, in accordance with aspects of the present disclosure, the vertical arm 204 may include a first toothed section 222. Additionally, each of the sliding arms 202 may include a corresponding second toothed section 224. In the example of FIG. 2, the first toothed section 222 of the vertical arm 204 is operatively coupled to the large gear 214. The large gear 214 in turn is coupled to the small gear 216. Further, the small gear 216 may be operatively coupled to the second toothed section 224 of the sliding arms 202. More specifically, the first and second toothed sections 222, 224 aid in coupling the vertical arm 204 to the sliding arms 202 via the large and small gears 214, 216. This coupling may in turn aid in reciprocal movement of the vertical arm 204 and the sliding arms 202. In one example, movement of the vertical arm 204 in the upward direction 226 may result in a rotation of the large gear 214. The rotation of large gear 214 may result in a rotary movement of the small gear 216, which in turn causes an outward movement 228 of the sliding arms 202.

In accordance with aspects of the present disclosure, the telescoping gauge 201 may be employed to measure a dimension, such as a diameter of a measurement zone corresponding to a physical asset, such as the physical asset 104 of FIG. 1. Accordingly, the telescoping gauge 201 may be disposed in the measurement zone of the physical asset. Further, the vertical arm 204 of the telescoping gauge 201 may be moved in the upward direction 226. Accordingly, the large gear 214, the small gear 216, the axis 220, and the spring 218 rotate causing the sliding arms 202 to move in the outward direction 228. This outward movement of the sliding arms 202 results in the sliding arms 202 being securely engaged with the measurement zone of the physical asset. More particularly, the sliding arms 202 may be securely engaged with side walls of the measurement zone via the contacting caps 212 of the telescoping gauge 201. The motion of the vertical arm 204 in the upward or downward direction and the motion of the sliding arms 202 in an inward or outward direction may collectively be referred to as a linear displacement.

Once the sliding arms 202 are engaged with the measurement zone, the dimensions of the measurement zone may be determined based on an upward displacement of the vertical arm 204 or an outward displacement of the sliding arms 202. In another example, when the sliding arms 202 are engaged with the side walls of the measurement zone, the dimensions of the measurement zone may be determined based on an angle of rotation of the large gear 214 and/or the small gear 216. In addition, in the event of movement of the vertical arm 204 in the downward direction 230, the sliding arms 202 may move in an inward direction 232 thereby disengaging the sliding arms 202 from the side walls of the measurement zone.

The linear displacement of the sliding arms 202 and/or the vertical arm 204 and the angle of rotation of the large gear 214 and/or the small gear 216 may be referred to as an analog measurement. The analog measurement may be converted into a digital measurement by employing a data digitizer, such as the data digitizer 110 of FIG. 1. The data digitizer may be operatively coupled to the sliding arms 202, the vertical arm 204, the coupling unit 206, or combinations thereof. Further, the digital measurement may be transferred to a processing subsystem, such as the processing subsystem 106 of FIG. 1 by employing the wireless unit 210. In the example of FIG. 2, the wireless unit 210 may be disposed on the vertical arm 204 of the measurement subsystem 200. In one embodiment, the wireless unit 210 may be configured to transfer the digital measurements from the measurement subsystem 200 to the processing subsystem by moving the two stage know 208 in a lateral direction.

Figure 3:
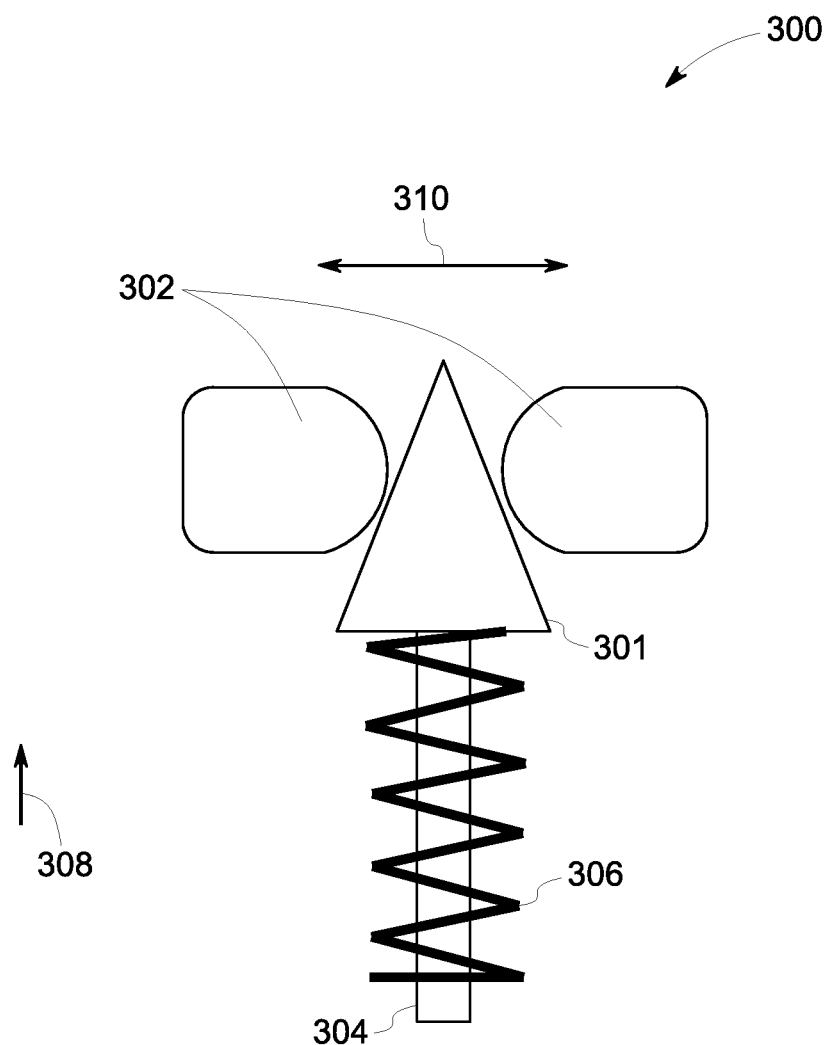
FIG. 3 is a diagrammatical representation of another embodiment of an exemplary measurement subsystem for use in the exemplary system of FIG. 1, according to aspects of the present disclosure.

Turning now to FIG. 3, a diagrammatical representation of another embodiment of an exemplary measurement subsystem 300 for use in the exemplary system 100 of FIG. 1, according to aspects of the present disclosure, is presented. It may be noted that the measurement subsystem 300 is similar to the measurement subsystem 200 of FIG. 2.

The measurement subsystem 300 includes a telescoping gauge 301. The telescoping gauge 301 includes two sliding arms 302, a vertical arm 304, and a coupling unit 306. The coupling unit 306 may include a spring. In one embodiment, the spring 306 may be disposed on the vertical arm 304, where the vertical arm 304 may be a pin shaped structure. Moreover, in the embodiment of FIG. 2, the coupling unit 306 in the form of a spring is used to operatively couple the vertical arm 304 to the sliding arms 302. The arrangement of FIG. 2 of coupling the vertical arm 304 to the sliding arms 302 may be referred to as a wedge coupling. The measurement subsystem 300 of FIG. 3 may be employed for measuring extremely small range of measurements. In one example, the range of measurements may be in a range from about 0.1 inch to about 0.5 inch. Moreover, in one example, exemplary tools such as the measurement subsystem 300 may be employed in gaps on the order of about 0.1 inch and call for precision on the order of 0.0001 inch.

In order to determine dimensions of a measurement zone, such as a relatively small bore/hole, the telescoping gauge 301 and in particular, the sliding arms 302 of the telescoping gauge 301 may be disposed in the measurement zone. Further, the vertical arm 304 may be displaced in an upward direction 308 such that the sliding arms 302 are displaced sideways 310. This movement of the vertical arm 304 results in the sliding arms 302 being securely engaged with side walls of the measurement zone. In one example, the vertical arm 304 may be displaced in the upward direction 308 by employing a two stage knob, such as the two stage knob 208 of FIG. 2. Once the sliding arms 302 are engaged with the side walls of the measurement zone, the displacement of the sliding arms 302 and the displacement of the vertical arm 304 may be converted into a corresponding digital measurement via use of a data digitizer, such as the data digitizer 110 of FIG. 1. Further, the digital measurement may be transferred to a processing subsystem, such as the processing subsystem 106 of FIG. 1. A wireless unit, such as the wireless unit 210 of FIG. 2 aids in wirelessly transferring the digital measurement to the processing subsystem.

Figure 4:
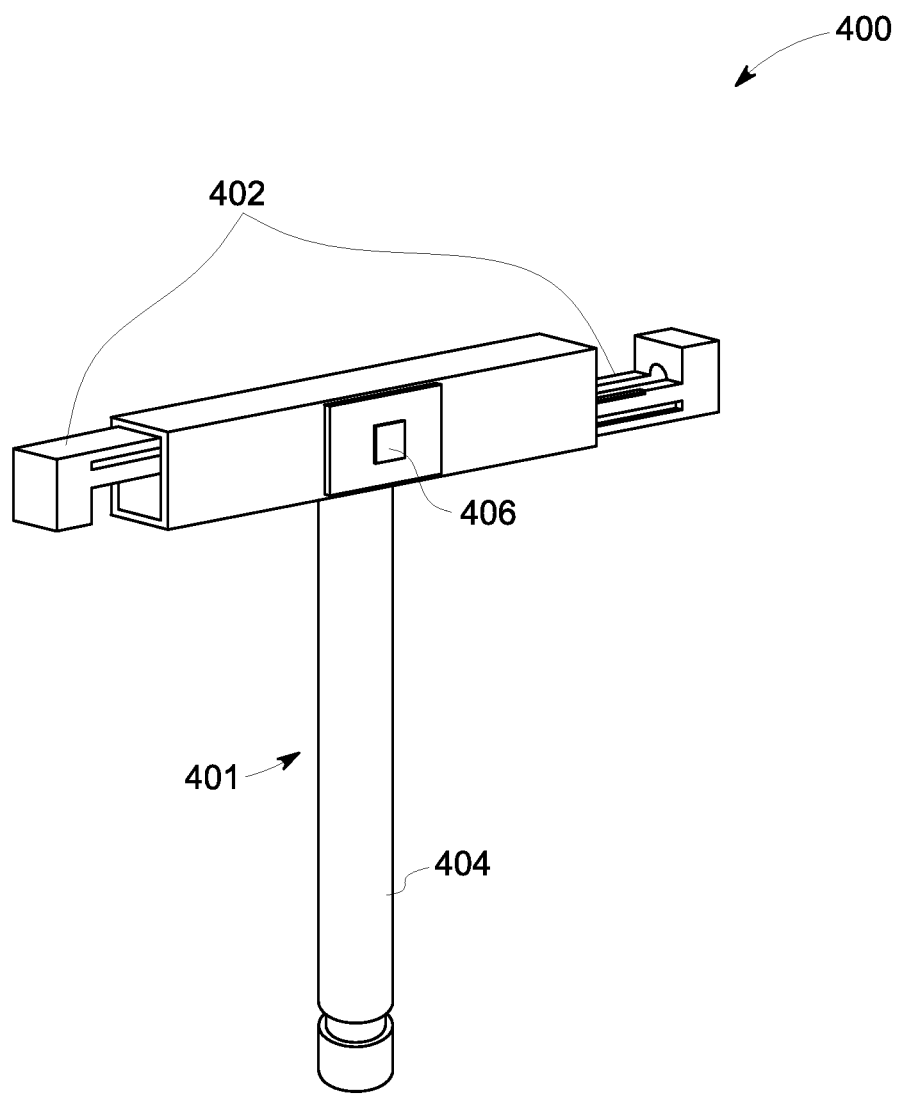
FIGS. 4 and 5 are diagrammatical representations of other embodiments of an exemplary measurement subsystem having a data digitizer for use in the exemplary system of FIG. 1, according to aspects of the present disclosure.
Figure 5:
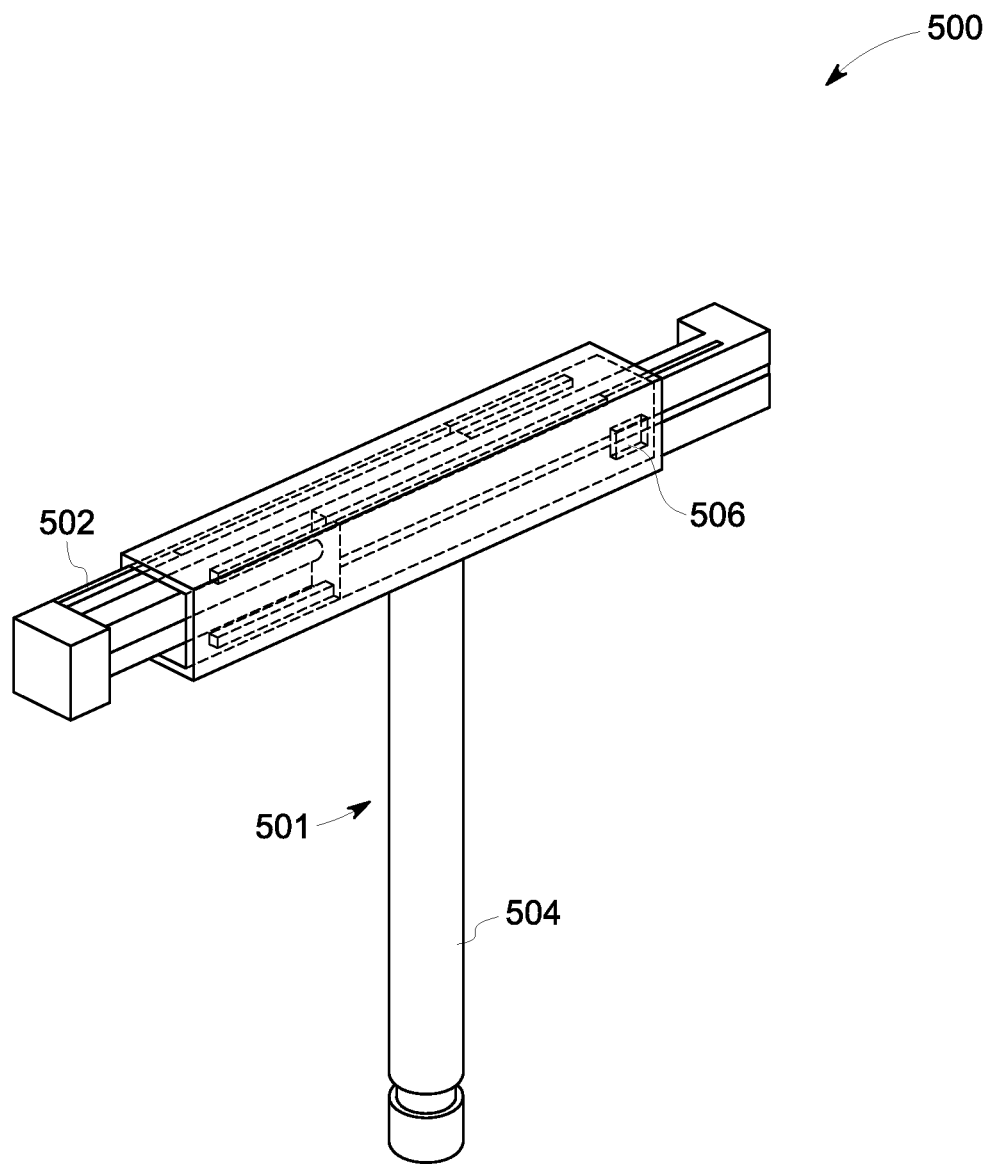

FIGS. 4 and 5 are diagrammatical representations of other embodiments of an exemplary measurement subsystem with a data digitizer for use in the system 100 of FIG. 1, according to aspects of the present disclosure. More particularly, in the embodiments of FIGS. 4-5 the data digitizer is an integral part of the telescoping gauge.

FIG. 4 is a diagrammatical representation 400 of an exemplary measurement subsystem having a data digitizer. The system 400 is configured for use in the exemplary system of FIG. 1. The measurement subsystem 400 may include a telescoping gauge 401 and a data digitizer 406. In the example of FIG. 4, the data digitizer 406 may be a rotary encoder. The telescoping gauge 401 includes sliding arms 402, a vertical arm 404, and a coupling unit (not shown). In one example, coupling unit is configured to couple the sliding arms 402 and the vertical arm 404. The coupling unit may include a large gear, a small gear, an axis, and a spring. It may be noted that the coupling unit of the system 400 may be substantially similar to the coupling unit 206 of FIG. 2. Further, the rotary encoder 406 may be coupled to the coupling unit.

As noted hereinabove, while measuring a dimension of a measurement zone of a physical asset, such as the physical asset 104 of FIG. 1, the sliding arm 402 may be disposed in the measurement zone and the vertical arm 404 may be moved in an upward direction causing the coupling unit to rotate. In particular, the movement of the vertical arm 404 in the upward direction causes the large gear and the small gear of the coupling unit to rotate, thereby resulting in the sliding arm 402 being moved in an outward direction. Consequently, the sliding arms 402 may be securely engaged with side walls of the measurement zone. Once the sliding arms 402 are suitably engaged, the dimensions of the measurement zone may be determined from an angle of rotation of the large gear and/or the small gear. The angle of rotation of the large gear and/or small gear may provide an analog measurement. In accordance with aspects of the present disclosure, the rotary encoder 406 may be configured to convert the analog measurement corresponding to the angle of rotation of the large gear and/or the small gear to a corresponding digital measurement. As previously noted, the digital measurement represents a digital readout of a diameter of the measurement zone. The rotary encoder 406 may include an absolute rotary encoder, an incremental rotary encoder, a magnetic polarization based rotary encoder, or combinations thereof.

FIG. 5 is a diagrammatical representation 500 of an exemplary measurement subsystem having a linear position encoder for use in the exemplary system of FIG. 1, according to aspects of the present disclosure. It may be noted that the linear position encoder may also be employed in the measurement subsystems 200, 300 of FIGS. 2 and 3 respectively.

The measurement subsystem 500 may include a telescoping gauge 501 and a data digitizer 506. In the example of FIG. 5, the data digitizer 506 may be a linear position encoder. In particular, the linear position encoder 506 may be configured to provide a digital measurement. The telescoping gauge 501 includes sliding arms 502 and a vertical arm 504. Furthermore, the telescoping gauge 501 includes a coupling unit, such as the coupling unit 206 of FIG. 2 for coupling the sliding arms 502 and the vertical arm 504. In one embodiment, the linear position encoder 506 may include a sensor, a transducer, or a read head paired with a scale that encodes position. In the example where the linear position encoder 506 is a read head paired with a scale that encodes position, a measurement may be obtained from the scale and the encoded position value may be converted into a digital measurement.

The linear position encoder 506 may be either incremental linear encoder or an absolute linear encoder. Furthermore, in certain embodiments, the linear position encoder 506 is a magnetic linear encoder, a capacitive linear encoder, an inductive linear encoder, an eddy current linear encoder, an optical linear encoder, or combinations thereof. The optical linear encoder operates using optical technologies such as shadow, self-imaging, and interferometry techniques.

As noted hereinabove with respect to FIG. 2, once the sliding arms are engaged to side walls of the measurement zone, the dimensions of the measurement zone may be determined based on an upward displacement of the vertical arm and/or an outward displacement of the sliding arms. In the example of FIG. 5, the linear position encoder 506 may be disposed on each of the sliding arms 502 of the telescoping gauge 501. In this embodiment, readings/measurements recorded by both the linear position encoders 506 on the sliding arms 502 may be used to generate a digital measurement corresponding to the dimension of the measurement zone. In the example of FIG. 5, both the sliding arms 502 are independent of each other. Therefore, the linear position encoder 506 corresponding to each sliding arm 502 measures the position of the corresponding sliding arm 502. Further, the dimension of the measurement zone may be determined by combining the readings recorded by the linear position encoder 506 corresponding to each of the sliding arms 502.

However, in another embodiment, the linear position encoder 506 may be disposed on the vertical arm 504 of the telescoping gauge 501. In this example, the linear position encoder 506 may be configured to provide a digital measurement corresponding to the dimension of the measurement zone based on an upward displacement of the vertical arm 504.

Turning now to FIG. 6, a diagrammatical representation 600 of use of an exemplary measurement and analysis system for determining measurements of a physical asset 602 is depicted. By way of example, the system 600 is configured to measure dimensions of a measurement zone 604 of the physical asset 602. As previously noted, the measurement zone 604 may have uniform dimensions along a length of the physical asset 602. However, in certain embodiments, the measurement zone 604 may have dimensions that vary along a length of the physical asset 602. The measurement and analysis system 600 includes a measurement subsystem 606 and a processing subsystem 610. The measurement subsystem 606 is similar to the measurement subsystems 200, 300 of FIGS. 2 and 3. Also, the processing subsystem may be similar to the processing subsystem 106 of FIG. 1.

The measurement subsystem 606 includes a telescoping gauge 601, a two stage knob 612, a data digitizer 614, and a wireless unit 616. Also, the telescoping gauge 601 includes sliding arms 618 and a vertical arm 620. The sliding arms 618 are coupled to the vertical arm 620 via a coupling unit, such as the coupling unit 206 of FIG. 2.

The measurement subsystem 606 may be disposed in the measurement zone 604 of the physical asset 602 in order to obtain measurements of the dimensions of the measurement zone 604. Accordingly, the measurement subsystem 606 may be positioned such that the sliding arms 618 of the measurement subsystem 606 are situated in the measurement zone 604. The two stage knob 612 may be used to move the sliding arms 618 and the vertical arm 620 of the telescoping gauge 601 such that the sliding arms 618 are securely engaged with side walls 608 of the measurement zone 604. Once the sliding arms 618 are securely engaged with the side walls 608 of the measurement zone 604, the data digitizer 614 may be employed to convert the displacement of the sliding arms 618 and/or the vertical arm 620 or a rotation angle of gears of the coupling unit into a digital measurement.

Further, the wireless unit 616 may be employed for transferring wirelessly the digital measurement from the measurement subsystem 606 to a processing subsystem 610. In one embodiment, lateral movement of the two stage knob 612 aids in transferring the digital measurement from the measurement subsystem 606 to the processing subsystem 610. In some embodiments, the processing subsystem 610 may include a computer, a smartphone, an iPad, an iPhone, a tablet, or combinations thereof.

In accordance with further aspects of the present disclosure, the system 600 may be configured to identify a condition of the physical asset 602. More particularly, the system 600 may be configured to determine the condition of the physical asset 602 based on the digital measurement generated by the measurement subsystem 606. In one embodiment, the processing subsystem 610 may be configured to compare the digital measurements with a baseline value in order to identify the condition of the physical asset 602. It may be noted that the baseline value may be determined based on a field trial, an experimental simulation, and the like. In one example, the condition of the physical asset may include at least one of a healthy condition and an anomaly condition of the physical asset.

FIG. 7 is a flow chart 700 depicting a method for measuring and analyzing a physical asset, according to aspects of the present disclosure. The method of FIG. 7 will be explained with respect to elements of FIGS. 1, 2, and 6. The method begins at step 702 where a telescoping gauge 601 is disposed in a measurement zone 604 of a physical asset 602. More particularly, the telescoping gauge 601 may be positioned such that the sliding arms 618 of the telescoping gauge 601 are situated in the measurement zone 604. As previously noted, the physical asset may include components of oil and gas fields. Also, the measurement zone 604 corresponding to the physical asset 602 may include a bore, a hole, a pipe, or combinations thereof.

Furthermore, at step 704, one or more analog measurements corresponding to the measurement zone 604 of the physical asset 602 may be determined using the telescoping gauge 601. To that end, the sliding arms 618 of the telescoping gauge 601 may be moved such that the sliding arms 618 are securely engaged with the side walls 608 of the measurement zone 604. In one embodiment, the two stage knob 612 may be moved/rotated to move the sliding arms 618. Once the sliding arms 618 are engaged with the side walls 612, analog measurements corresponding to the measurement zone 604 may be obtained. As previously noted, the analog measurements are representative of a displacement of the vertical and/or sliding arms of the telescoping gauge 601, a rotation angle of the plurality of gears of the telescoping gauge 601, or a combination thereof.

Subsequently, at step 706, the one or more analog measurements corresponding to the measurement zone 604 of the physical asset 602 may be converted to one or more corresponding digital measurements. In one embodiment, the analog values of the measurements may be converted into corresponding digital measurements via use of the data digitizer 614. In certain embodiments, a series of digital measurements may be generated. In one example, the data digitizer 614 may be used to generate the series of digital measurements. Additionally, in one example, the processing subsystem 106 may be configured to monitor any change in the digital measurements over a determined time period. Accordingly, in this example, the series of digital measurements may include time indexed digital measurements. In another example, the series of digital measurements may correspond to a range of measurements acquired along a desired length of the physical asset 104. In this example, a desired measurement may be inferred and/or interpolated from the series of digital measurements.

In yet another example, the series of digital measurements may be smoothed to generate a smoothed series of digital measurements. In certain embodiments, the processing subsystem 106 may be configured to generate the smoothed series of digital measurements by averaging the series of digital measurements. Furthermore, the processing subsystem 106 may also be configured to identify a desired measurement based on the smoothed series of digital measurements. In one example, the desired measurement may be representative of a maximum value corresponding to the smoothed series of digital measurements. Moreover, the desired measurement may be employed to identify a condition of the physical asset 104. Use of the desired measurement aids in minimizing errors due to subjective judgment of a field operator. In one embodiment, the data digitizer 614 may include a rotary encoder, a linear position encoder, and the like.

In addition, at step 708, the one or more digital measurements may be wirelessly transferred to the processing subsystem 610. In certain embodiments, the wireless unit 616 may be employed for transferring wirelessly the digital measurements from the measurement subsystem 606 to the processing subsystem 610. Also, in one embodiment, a lateral movement of the two stage knob 612 aids in triggering the transfer of the digital measurements from the measurement subsystem 606 to the processing subsystem 610. Similarly, the cloud of digital measurements may be transferred wirelessly from the wireless unit 610 to the processing subsystem 610.

Moreover, at step 710, the one or more digital measurements or the series of digital measurements may be processed in real-time to identify a condition of the physical asset 602. In certain embodiments, the processing subsystem 610 may be used to identify the condition of the physical asset 602 by processing the digital measurements in real-time. By way of example, the series of the digital measurements may be processed by the processing subsystem 106 to generate application specific interpretations of the series of digital measurements. In particular, the processing subsystem 610 may be configured to compare the digital measurements with a baseline value to identify the condition of the physical asset 602. In one example, the condition of the physical asset 602 may be a healthy condition or an anomaly condition of the physical asset 602. If an anomaly condition is identified, an alarm or a visual display may be activated to accordingly inform a field operator.

In certain other embodiments, the processing subsystem 610 may be configured to process the cloud of digital measurements to generate a smoothed cloud of digital measurements. In one example, the processing subsystem 610 may employ a smoothing algorithm to generate the smoothed cloud of digital measurements. In addition, the processing subsystem 610 may be configured to generate a desired measurement based on the smoothed cloud of digital measurements. In one example, the desired measurement may be representative of a maximum value corresponding to the smoothed cloud of digital measurements. In this example, processing subsystem 610 may be configured to identify the condition of the physical asset 602 based on a comparison of the desired measurement with the baseline value.

Furthermore, the foregoing examples, demonstrations, and process steps such as those that may be performed by the system may be implemented by suitable code on a processor-based system, such as a general-purpose or special-purpose computer. It should also be noted that different implementations of the present disclosure may perform some or all of the steps described herein in different orders or substantially concurrently, that is, in parallel. Furthermore, the functions may be implemented in a variety of programming languages, including but not limited to C, C++, or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may include paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the systems and the method for measuring dimensions corresponding to a physical asset described hereinabove provide a framework for measuring dimensions of the physical and determining a condition of the physical asset by processing the measured dimensions. Moreover, the systems and the method provide automated digital measurements of the dimensions of the physical asset, thereby facilitating enhanced efficiency and repeatability of the measurements of the physical asset. Consequently, multiple sets of measurement data may be obtained that are devoid of manual errors. Additionally, the systems and method facilitate simpler and faster collection and analysis of a plurality of sets of measurement data. Moreover, the systems and method also allow real-time analysis of the digital measurements, thereby providing timely information on the condition of the physical assets, which may in turn aid in prompt servicing and maintenance of physical assets.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A measurement system for determining dimensions of a measurement zone of a physical asset, comprising:
    a telescoping gauge configured to determine one or more analog measurements corresponding to the measurement zone of the physical asset, wherein the telescoping gauge comprises a sliding arm and a vertical arm;
    a two stage knob disposed on the telescoping gauge and configured to move the sliding arm and the vertical arm of the telescoping gauge;
    a data digitizer operatively coupled to the telescoping gauge and configured to convert the one or more analog measurements to corresponding one or more digital measurements; and
    a wireless unit operatively coupled to the telescoping gauge and configured to wirelessly transmit the one or more digital measurements.

2. The system of claim 1, wherein the measurement zone comprises a bore, a hole, a pipe, or combinations thereof.

3. The system of claim 1, wherein the measurement zone has uniform dimensions, varying dimensions, or a combination thereof.

4. The system of claim 1, wherein the telescoping gauge further comprises a coupling unit configured to couple the sliding arm to the vertical arm, and wherein the coupling unit comprises a plurality of gears.

5. The system of claim 1, wherein the telescoping gauge further comprises a spring configured to couple the sliding arm to the vertical arm.

6. The system of claim 1, wherein the data digitizer comprises a rotary encoder, a linear position encoder, or a combination thereof.

7. The system of claim 1, wherein the data digitizer is further configured to generate a series of digital measurements.

8. The system of claim 7, further comprising a processing subsystem configured to determine, in real-time, a condition of the physical asset based on the one or more digital measurements, the series of digital measurements, or a combination thereof.

9. The system of claim 8, wherein the processing subsystem is further configured to process the series of digital measurements to generate application specific interpretations of the series of digital measurements.

10. The system of claim 1, wherein the vertical arm, the sliding arms, or both the vertical and the sliding arms comprise a toothed section.

11. A method for determining dimensions of a measurement zone of a physical asset, the method comprising:
    determining one or more analog measurements corresponding to the measurement zone of the physical asset using a telescoping gauge, wherein the telescoping gauge comprises at least two sliding arms, a vertical arm, or combinations thereof, and wherein a two stage knob is disposed on the telescoping gauge and configured to move the sliding arm and the vertical arm of the telescoping gauge;
    converting the one or more analog measurements to one or more digital measurements using a data digitizer;
    transferring wirelessly the one or more digital measurements to a processing subsystem; and
    identifying in real-time a condition of the physical asset based on processing the one or more digital measurements.

12. The method of claim 11, further comprising disposing the telescoping gauge in the measurement zone corresponding to the physical asset.

13. The method of claim 11, wherein the telescoping gauge further comprises a plurality of gears, a spring, an axis, or combinations thereof.

14. The method of claim 13, wherein disposing the telescoping gauge in the measurement zone further comprises causing movement of the plurality of gears, the spring, the axis, the at least two sliding arms, the vertical arm, or combinations thereof such that the at least two sliding arms of the telescoping gauge are operatively coupled to side walls of the measurement zone.

15. The method of claim 14, wherein determining the one or more analog measurements comprises determining a rotation angle of the plurality of gears, a linear displacement of at least one of the at least two sliding arms and the vertical arm, or a combination thereof.

16. The method of claim 15, wherein converting the one or more analog measurements to the one or more digital measurements comprises converting one or more of the rotation angle, the linear displacement of at least one of the at least two sliding arms and the vertical arm into the one or more digital measurements.

17. The method of claim 11, further comprising generating a series of digital measurements.

18. The method of claim 17, wherein identifying in real-time the condition of the physical asset comprises comparing the one or more digital measurements, the series of digital measurements, or a combination thereof with a baseline value to ascertain the condition of the physical asset.

19. The method of claim 11, wherein identifying in real-time the condition of the physical asset comprises:
    computing a desired measurement based on the one or more digital measurements; and
    comparing the one or more digital measurements with the desired measurement to identify the condition of the physical asset.

20. A system for measuring dimensions of a physical asset, the system comprising:
    a measurement subsystem operatively coupled to the physical asset, wherein the measurement subsystem comprises:
        a telescoping gauge comprising at least two sliding arms and a vertical arm, wherein the telescoping gauge is disposed in a measurement zone of the physical asset and configured to determine one or more analog measurements corresponding to the measurement zone of the physical asset;

a two stage knob disposed on the telescoping gauge, wherein the two stage knob is configured to move the at least two sliding arms and the vertical arm of the telescoping gauge to operatively couple the at least two sliding arms and the vertical arm to sidewalls of the measurement zone of the physical asset;

a data digitizer operatively coupled to the telescoping gauge and configured to convert the one or more analog measurements to one or more corresponding digital measurements;

a wireless unit operatively coupled to the telescoping gauge, the data digitizer, or both and configured to wirelessly transmit the one or more digital measurements; and a processing subsystem configured to identify in real-time a condition of the physical asset based on the one or more digital measurements, a series of digital measurements, or a combination thereof.

* * * * *